Aug. 19, 1924.

R. HENTSCHEL 1,505,344

STRENGTH TESTING DEVICE

Filed July 3, 1922          2 Sheets-Sheet 1

Inventor:
Rudolf Hentschel

Aug. 19, 1924.

R. HENTSCHEL 1,505,344

STRENGTH TESTING DEVICE

Filed July 3, 1922

2 Sheets-Sheet 2

Inventor:
Rudolf Hentschel.

Patented Aug. 19, 1924.

1,505,344

UNITED STATES PATENT OFFICE.

RUDOLF HENTSCHEL, OF BRIEG, GERMANY.

STRENGTH-TESTING DEVICE.

Application filed July 3, 1922. Serial No. 572,757.

*To all whom it may concern:*

Be it known that I, RUDOLF HENTSCHEL, a citizen of the Republic of Germany, residing at Brieg, District of Breslau, Germany, have invented certain Improvements in Strength-Testing Devices, of which the following is a specification.

The present invention relates to a strength-testing apparatus and consists in the provision of a punching-ball fitted in a spring-supported holder which indicates the strength of each punch by the rotary adjustment of a pointer on a dial. Means are provided for arresting the pointer in operative position, for restoring it to the zero-position, and also for releasing the mechanism by means of an inserted coin.

In a modified arrangement means are provided for causing the ball, under the force of successive blows, to operate different pointers, and a counter is provided for registering the number of times the apparatus has been used.

In the accompanying drawings—

Figure 1:
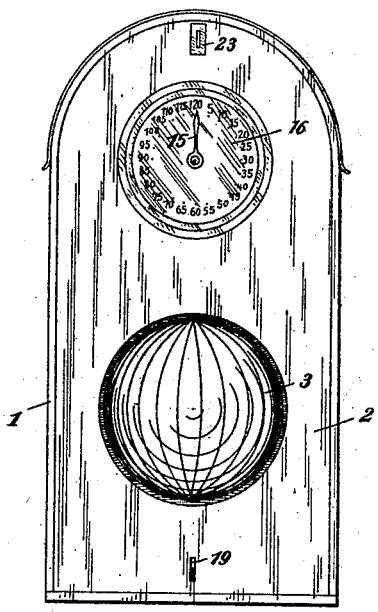
Figure 2:
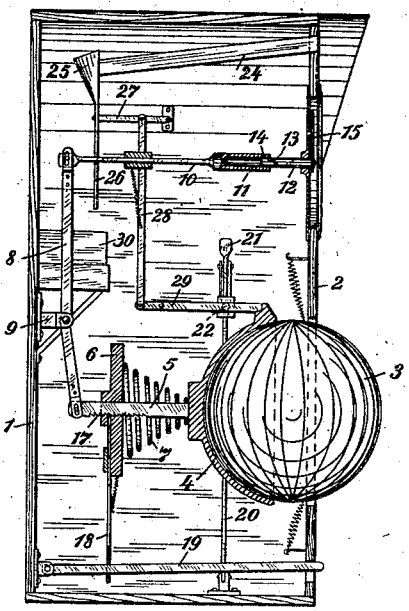

Fig. 1 represents a front view of one construction of the device,

Fig. 2, a sectional side view, and

Figure 3:
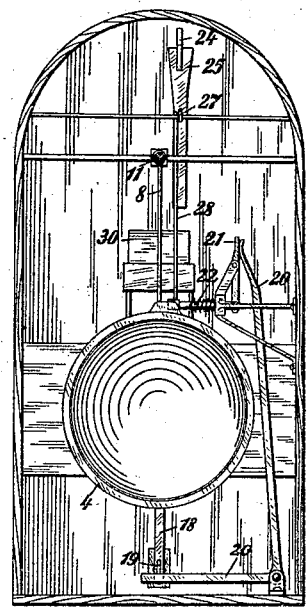

Fig. 3, a sectional front view of the same.

Figure 4:
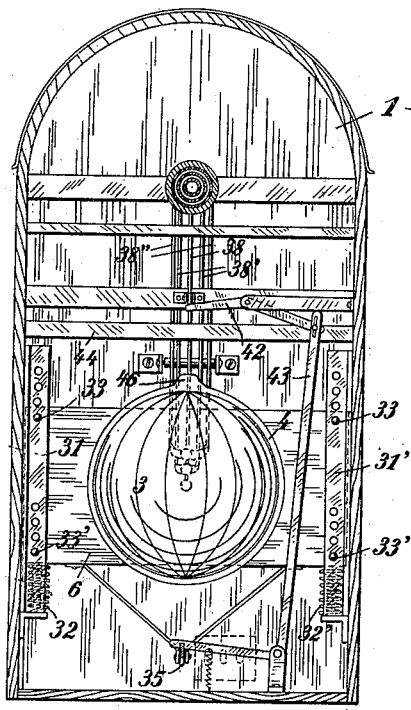
Figure 5:
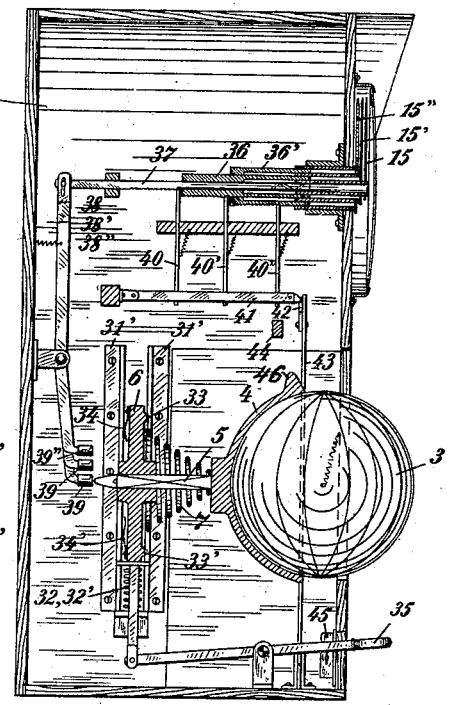
Figure 6:
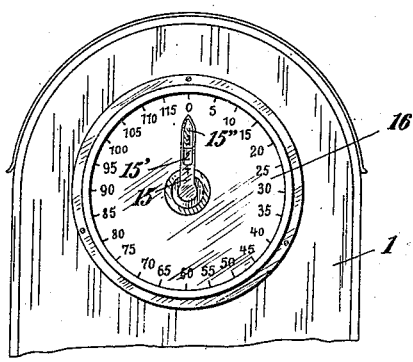

Figs. 4 and 5 are vertical sections at right angles of a modified construction, and Fig. 6, a front view of the dial and the pointers used in this construction.

In Figs. 1 to 3 the front wall 2 of a cabinet 1 exhibits a punching-ball 3, a dial 16 with a pointer 15, a coin slot 23, and the end of a restoring lever 19. The ball 3 is held against a dished plate 4 connected to a rod 5 which is slidably arranged in a guide plate 6. A spring 7 bears against the plates 6 and 4 and enables the latter to yield under the force of the blow when the ball is punched, the harder the blow the greater the displacement of the rod 5. The rod is formed with ratchet teeth 17 which are engaged by a spring-actuated catch 18 so as to lock the rod and the ball in the position to which it has been displaced. The lever 19 is connected to the catch 18 so that it can be operated for releasing the rod and restoring the elements to their normal position.

The rod 5 is pivoted at one end of a double-armed lever 8 which is pivoted to a bracket 9 and whose opposite arm is pivoted to a rod 10, this rod being thus displaced together with and in opposite direction to the rod 5. The sleeve 11 at the free end of the rod 10, telescopes on a shaft 14 connected to the pointer 15. A helical groove 13 on the shaft 14 is engaged by a stud connected to the sleeve and causes the pointer to change its position on the dial when the ball 3 is punched. The harder the blow the more extensive will be the movement of the pointer which thus indicates on the dial the force with which the ball has been struck.

The device is normally locked by a pivoted latch 29 which for that purpose engages a lug projecting from the plate 4. The latch is connected by a spring-actuated rod 28 with a lever 27 the free end of which takes into a coin chute 26, the elements being so adjusted that the weight of a coin is sufficient to turn the lever 27 so as to lift the latch 29 and release the ball. The coins are led by means of a channel 24 from the slot 23 to a funnel 25 communicating with the chute 26. The latter discharges the coins into a collecting till 30. When the latch 29 is turned by the insertion of a coin, a spring-pressed rod 22 snaps behind it and retains it in operated position. For the withdrawal of the rod 22, a lever 21 is provided which is operated by an elbow lever 20, the latter being arranged so as to be engaged and rocked by the lever 19 when this lever is operated for restoring the elements to the normal position.

In the construction according to Figs. 4 to 6, the guide plate 6 is slidably held between vertical guide rails 31, 31' and is supported by springs 32, 32' which tend to raise the plate together with the ball 3. Blade springs 34, 34', arranged behind the plate, cause it to engage with apertures in the front rails, for which purpose the plate is formed with projections 33, 33' arranged so as to snap into the apertures. There are apertures adapted to retain the plate in different altitudes, the lowest position being the initial one. When the ball 3 is punched, the plate 6 is disengaged from the apertures which retain it in position, whereupon it is raised by the springs 32, 32' until it reaches the next set of apertures and engages with these under the influence of the springs 34, 34'. A lever 35, which projects through the front wall of the cabinet, can be actuated for restoring the plate to the initial position. The rod 5, instead of being pivoted to the pointer-operating mechanism, is arranged so as to strike, according to its position, against different levers operating different pointers. Three pointers 15, 15', 15'' are provided which are connected to separate, hollow, concentric shafts. Slidably arranged in the innermost shaft is a rod 37 by the axial reciprocation of which a rotary movement is imparted to the shaft through the medium of a stud engaging a helical groove, as previously described. Sleeves 36, 36' operate the outer shafts in a similar manner. The rod 37 is reciprocated by a lever 38, and the sleeves 36, 36' are reciprocated by sleeves 38', 38''. These levers are double-armed and end in buffer-heads 39, 39', 39'' arranged in a vertical row and so as to oppose the rod 5, each in a different position of the latter. As the guide plate 6 is automatically shifted from one position to the next at each punch, and as a different indicating mechanism comes into operation at each position, the force of three successive punches will be indicated on the dial 16 at the same time. The pointers are numbered 1, 2 and 3 so that the different blows can be identified.

To retain the pointers in operated position, the rod 37 and the sleeves 36, 36' are formed with ratchet teeth which are engaged by spring-actuated catches 40, 40', 40''. To release these catches, a lever 41 is provided which engages studs or projections on the catches so as to cause them to participate in its downward movement. The lever 41 cooperates with an elbow lever 42, and the latter with an elbow lever 43, which is engaged by the lever 35. Thus the pointers will be restored together with the plate 6 to the initial position by the operation of the lever 35.

In the highest position of the ball holder, a lug 46 is placed in front of a bar 44 which prevents the holder from moving.

A counting device 45 is arranged so as to be operated by the lever 35 for indicating the number of times the apparatus has been in use.

I claim:—

1. A strength testing apparatus comprising a cabinet, vertical guide rails fitted in said cabinet, a vertical plate guided longitudinally between said guide rails, a transverse rod guided axially in said plate, a punching-ball supported by said rod, a spring arranged on the plate so as to support the rod and oppose movements imparted to the same by blows applied to the ball, springs tending to lift the plate, springs adapted to arrest the plate in different positions and to yield under the blows applied to the ball so as to allow the lifting springs to shift the plate to a fresh position after each blow, levers arranged so as to be operated by the rod in its different positions, a dial, pointers arranged on concentric shafts so as to move over said dial, connections between the different levers and pointers whereby the latter are moved so as to indicate on the dial the extent of the rod movements, means for arresting the pointers in operated position, and means for restoring the elements to their normal position.

2. A strength testing apparatus comprising a cabinet, vertical guide rails fitted in said cabinet, a vertical plate guided longitudinally between said guide rails, a transverse rod guided axially in said plate, a punching-ball supported by said rod, a spring arranged on the plate so as to support the rod and oppose movements imparted to the same by blows applied to the ball, springs tending to lift the plate, springs adapted to arrest the plate in different positions and to yield under the blows applied to the ball so as to allow the lifting springs to shift the plate to a fresh position after each blow, levers arranged so as to be operated by the rod in its different positions, a dial, pointers arranged on concentric shafts so as to move over said dial, these shafts being provided with internal helical grooves, sleeves guided in the shafts and connected to the levers so as to be reciprocated thereby, said sleeves being provided with external ratchet racks, studs in the sleeves engaging the helical grooves in the shafts so as to turn the latter when reciprocated and cause the pointers to indicate on the dial the extent of the rod movements, catches engaging the ratchet racks on said sleeves so as to arrest them in operated position, a hand lever for releasing said catches and for restoring the plate to its initial position, and a counting device arranged so as to be operated by said lever.

RUDOLF HENTSCHEL.

Witnesses:
E. HOLTZERMAN,
L. A. HANSEN.